Feb. 14, 1933.  H. K. FAIRALL  1,897,368

MOTION PICTURE CAMERA

Filed June 13, 1927

INVENTOR:
HARRY K. FAIRALL
BY
ATTORNEY.

Patented Feb. 14, 1933

1,897,368

UNITED STATES PATENT OFFICE

HARRY K. FAIRALL, OF LOS ANGELES, CALIFORNIA, ASSIGNOR, BY MESNE ASSIGNMENTS, TO MULTICOLOR LTD., OF LOS ANGELES, CALIFORNIA, A CORPORATION OF CALIFORNIA

MOTION PICTURE CAMERA

Application filed June 13, 1927. Serial No. 198,495.

My invention relates to a motion picture camera in which a plurality of strips of film are simultaneously unwound from magazines onto reels.

In one process of colored motion picture work two negatives are simultaneously exposed through different color filters so that complementary color-value images are recorded on the negatives. In this process two films are run through the camera in back of the lens in superimposed position—one in front of the other. I have found that where the two films are carried on the same reel and rewound on a single reel there is a tendency for buckling and for one of the films to become slack.

Another important part of the invention is that the emulsions of the two negatives are in actual contact with each other so that no intervening space which would permit distortion of the two images simultaneously recorded on the films is allowed and wherein the emulsions of both films are arranged in the focal plane of the lens of the camera so that the color-value images on either of the films will not be blurred.

It is an object of this invention to provide a camera in which two or more films may be wound from and onto magazines without any buckling or slack in the films.

A further object of the invention is to provide a camera of this character in which color-value negatives are wound on separate magazines.

Another object of the invention is to provide a camera in which the emulsions of color-value negatives are held in actual contact with each other in the focal plane of the lens, so that the color-value images on either of the films will not be blurred.

Another object of the invention is to provide a camera of this character in which the films are wound on separate magazines.

Another object of the invention is to provide a camera of this character in which the take-up or rewind magazines are frictionally driven.

Other objects and advantages of the invention will be made evident hereinafter.

In the course of the following description reference will be had to the accompanying drawing in which.

Figure 1:
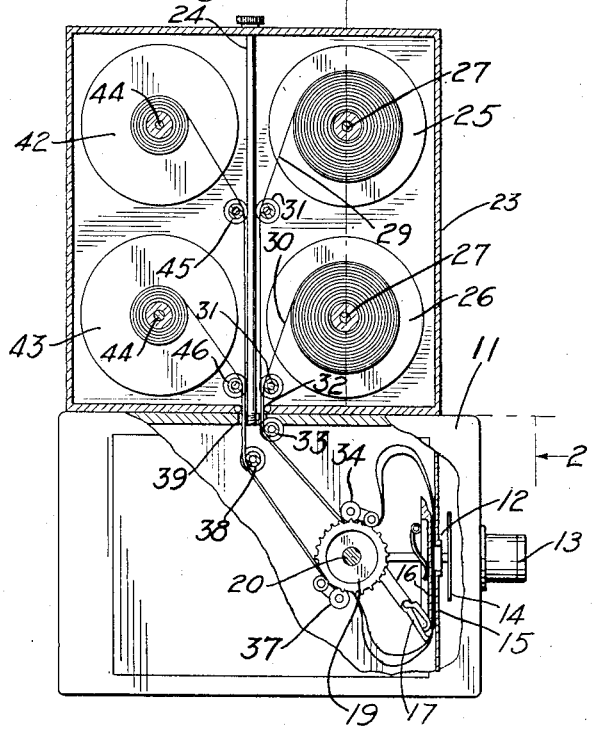
Fig. 1 is an elevational view partly sectioned.

Referring to the drawing in detail the camera box 11 of the invention includes the ordinary camera mechanism as generally indicated by the numeral 12. The mechanism 12 includes a lens 13, a shutter 14, an aperture plate 15, a clamp block 16, film advancing mechanism 17, and a main sprocket 19. The main sprocket 19 is carried on a main shaft 20 which is operated by a crank 21.

Supported above the camera box 11 is the magazine box 23 of the invention. The magazine box 23 is secured in place by the lock screw 24 of the invention. Carried in the magazine box 23 are primary and secondary feed magazines 25 and 26 which are supported on shafts 27, and which carry primary and secondary films 29 and 30. The primary and secondary films pass over guide rollers 31 and through an aperture 32 into the camera box 11. Passing over a guide roller 33 the films 29 and 30 extend to the main sprocket 19 by means of which they are driven, these films being held in contact with the drive sprocket 19 by idlers 34. It should be noted that the two films 29 and 30 pass over the main sprocket 19 in superimposed position and in the focal plane of the lens 13. In order to so feed the films it is necessary to place the feed magazine 25 and 26 so that they rotate in the same planes. The films 29 and 30 pass from the main sprocket 19 between the aperture plate 15 and the clamp block 16 and are advanced a frame at a time by the advancing mechanism 17. The films 29 and 30 after passing through the mechanism just mentioned are again passed in contact with the main sprocket 19, being held in engagement by lower idlers 37. By this arrangement the films are fed to the advancing mechanism and taken therefrom at the same rate of speed. The two films pass over a guide roller 38 and through an aperture 39 into the interior of the magazine box 23.

The primary and secondary take-up magazines 42 and 43 are supported in the magazine box 23 on rotatable shafts 44. The take-up magazines are adapted to rotate in the same planes as the feed magazines rotate. The primary film 29 extends over a guide roller 45 and is wound onto the primary take-up magazine 42, and the secondary film 30 extends over a guide roller 46 and is wound onto the secondary take-up magazine 43.

Figure 2:
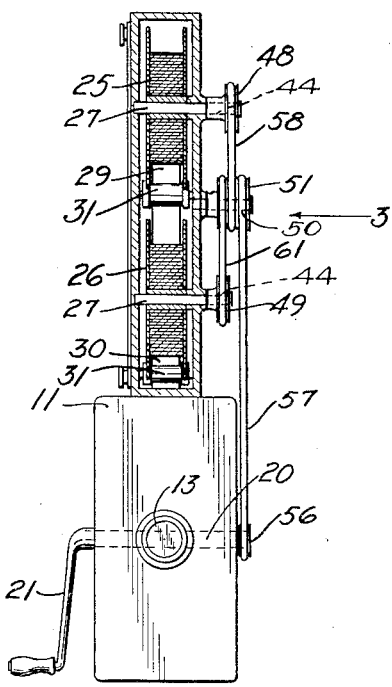
Fig. 2 is a view partly sectioned taken on the line 2—2 of Fig. 1.
Figure 3:
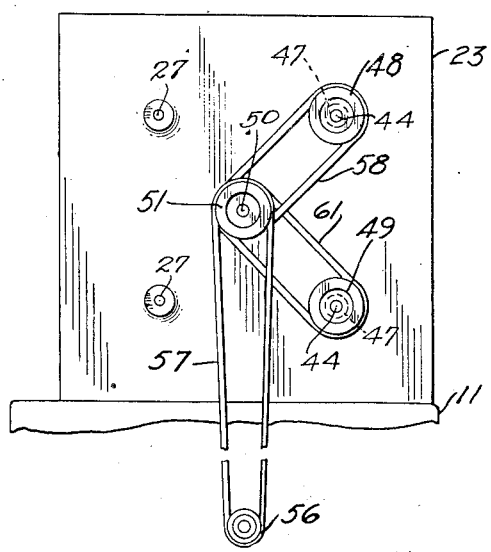
Fig. 3 is an elevational view taken as indicated by the arrow 3 of Fig. 2.
Figure 4:
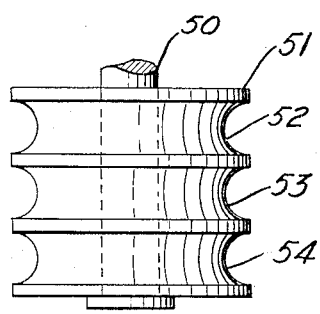
Fig. 4 is a perspective view of the main pulley of the invention.

As shown best in Figs. 2 and 3, the shafts 44 extend through bearings 47 of the magazine box 23; and the outer end of the shaft 44 associated with the primary take-up magazine 42 has a primary pulley 48 attached thereto, and the shaft 44 associated with the secondary take-up magazine 43 has a secondary pulley 49 secured therto. Projecting outward from the magazine box 23 is a spindle 50 which rotatably supports a main pulley 51. As shown clearly in Fig. 4 the main pulley 51 has three grooves 52, 53, and 54. The main shaft 20 of the mechanism 12 extends from the camera box 11 and has a drive pulley 56 secured on it. Extending around the drive pulley 56 and the main pulley 51 is a drive belt 57, this drive belt 57 resting in the groove 54 of the main pulley 51. The purpose of the drive belt is to rotate the main pulley whenever the camera mechanism 12 is operated. It should be understood that the main pulley may be connected to be operated synchronously with the mechanism 12 in other suitable manners. It should be noted that the drive pulley 56 is of a much smaller diameter than the main pulley 51 so that it will be rotated at a higher rate of speed. Connecting the primary pulley 48 and the main pulley 51 is a primary friction belt 58, this primary friction belt 58 resting in the groove 53 of the main pulley 51. Connecting the secondary pulley 49 with the main pulley 51 is a secondary friction belt 61, the secondary friction belt 61 resting in the groove 52 of the main pulley 51. These friction belts may be of any suitable form such as in the form of a coil spring. When the main pulley 51 is operated, the primary and secondary pulleys 48 and 49 are frictionally driven, that is to say, if a high resistance is placed on either of the pulleys the drive belt will permit a slippage.

The operation of the invention is as follows:

When the crank 21 is turned, the camera mechanism 12 is operated so that the film is advanced therethrough. As film is needed it is pulled from the primary and secondary feed magazines 25 and 26. These feed magazines are supported in the magazine box so that they will feed the film as it is needed. The primary and secondary take-up magazines 42 and 43 are at this time rotated and will hold the primary and secondary films tight so that there will be no buckling or slack in either of them. The main pulley 51 rotates quite fast and the primary and secondary belts 58 and 61 move quite fast. They move faster than the films 29 and 30 permit the take-up magazines 42 and 43 to be rotated. By this arrangement it is assured that there will never be any slack in either of the films. The primary and secondary belts 58 and 61 being of the spring type readily slip on the primary and secondary pulleys 48 and 49.

From the foregoing description it will be seen that by carrying the primary and secondary films on separate feed and take-up magazines there will never be any buckling or slack, or any injurious strains placed on them. The important part of the invention resides in the winding of the film on separate take-up magazines and the frictional means for operating them so that the take-up magazines are always rotated fast enough to keep the primary and secondary films tight.

I claim as my invention:

1. In a camera, the combination of: a lens; film advancing means adapted to engage superimposed films for advancing same in the focal plane of said lens; feed means for supplying said films to said film advancing means; a spindle having a crank for operating said film advancing means; a film receptacle connected to said camera; a plurality of shafts mounted in said receptacle; magazines carried by said shafts on which said films are each wound when they pass from said advancing means; a drive pulley mounted on said spindle; a main pulley mounted on one of said receptacle shafts and having a series of grooves; pulleys mounted on the other of said receptacle shafts; a drive belt connecting said drive and main pulleys; friction belts connecting said main pulley with each of the other of said pulleys; and said main pulley adapted to drive the other of said pulleys in such manner that if high resistance is placed on either of said pulleys, said drive belt will permit a slippage of said belts.

2. A camera comprising: a lens; film advancing means adapted to engage superimposed films for advancing same in the focal plane of said lens; a spindle having a crank for operating said film advancing means; a film receptacle connected to said camera; shafts mounted in said receptacle; magazines supported on said shafts on which said films are separately wound as they pass from said advancing means; a drive pulley on said spindle; pulleys journalled on said magazine shafts; a main pulley journalled on one of said magazine shafts, said main pulley having a series of grooves formed therein; a drive belt connecting said spindle and said main pulley; and friction belts connecting said main pulley and each of the other of said pulleys for separately driving said magazines.

3. A camera comprising: a lens; film advancing means adapted to engage superimposed films for intermittently advancing same in the focal plane of said lens; a crank for operating said film advancing means; a spindle formed with said crank; a film receptacle connected to said camera; shafts mounted in said receptacle; magazines supported on said shafts on which said films are separately wound as they pass from said advancing means; a drive pulley on said spindle; a shaft mounted in said receptacle between the other of said shafts; a main pulley mounted on said shaft; pulleys mounted on the other of said shafts; a drive belt connecting said drive and main pulleys; friction belts connecting said main pulley and each of the other of said pulleys and providing separate friction means for driving said magazines at different relative speeds.

4. In a photographic camera for exposing a pair of sensitive films, the combination of a light proof casing, means for supporting a pair of sensitive films in said light proof casing, main drive means adapted for operation at uniform speed, a camera having a film driving means operated by said main drive means, and a lens associated with said film driving means and adapted for the exposure of said films to a source of light, a first rotatable take-up magazine in said casing upon which one of said films is wound, a second rotatable take-up magazine in said casing on which the other of said films is wound, a first frictional drive means connected to said main drive means and said first take-up magazine, and a second frictional drive means connected to said main drive means and said second take-up magazine.

In testimony whereof, I have hereunto set my hand at Los Angeles, California, this 27th day of May, 1927.

HARRY K. FAIRALL.